United States Patent [19]
Godeau

[11] Patent Number: 5,209,523
[45] Date of Patent: May 11, 1993

[54] CONNECTING DEVICE PARTICULARLY FOR THE ASSEMBLY OF A HOSE WITH A HEAT EXCHANGER OF AN AUTOMOTIVE VEHICLE

[75] Inventor: Denis Godeau, Vieilles Maison sur Joudry, France

[73] Assignee: Hutchinson, Paris, France

[21] Appl. No.: 795,514

[22] Filed: Nov. 21, 1991

[30] Foreign Application Priority Data

Nov. 27, 1990 [FR] France ............................... 90 14787

[51] Int. Cl.[5] ........................................... F16L 35/00
[52] U.S. Cl. ..................................... 285/93; 285/305; 285/379
[58] Field of Search .................. 285/305, 379, 380, 93

[56] References Cited

U.S. PATENT DOCUMENTS

| | | | |
|---|---|---|---|
| 3,149,362 | 9/1964 | Smithson | 285/305 X |
| 3,314,696 | 4/1967 | Ferguson et al. | |
| 4,009,896 | 3/1977 | Brewer | 285/305 |
| 4,524,997 | 6/1985 | Ebert | 285/380 X |
| 4,881,760 | 11/1989 | Runkles et al. | |

FOREIGN PATENT DOCUMENTS 327441 8/1989 European Pat. Off. .
392234 10/1990 European Pat. Off. .

Primary Examiner—Dave W. Arola
Attorney, Agent, or Firm—Bell, Seltzer, Park & Gibson

[57] ABSTRACT

A connecting device, particularly for the assembly of a hose with a heat exchanger of an automotive vehicle. It comprises a mobile ring (25) housed inside one of the two elements of the connecting device, and which comprises on its periphery at least one tab elastically deformable in radial direction (28, 29) and a U-shaped clip integral with the element (2) provided with notches and slits (18, 19), the arms of the clip being separated by the ring (25) as long as the device is not assembled, but resuming their operating position of immobilization of the connecting device when the ring is displaced in the tubular component (2), upon said component being brought close to socket (1) associated with the waterbox of the heat exchanger.

9 Claims, 3 Drawing Sheets

CONNECTING DEVICE PARTICULARLY FOR THE ASSEMBLY OF A HOSE WITH A HEAT EXCHANGER OF AN AUTOMOTIVE VEHICLE

The invention relates to a connecting device, particularly for the assembly of a hose with the heat exchanger of an automotive vehicle.

It concerns, more specifically, a connecting device which allows rapid mounting and dismounting with the aid of an assembly using as an elastic link a U-shaped clip the arms of which are approximately parallel. A device of this type is described, for example, in French Patent Specification No 2 626 662 in which a tubular connector and a waterbox of a heat exchanger are kept assembled by means of a U-shaped clip the arms of which are housed in mutually parallel and diametrically opposed transverse notches cut in the tubular connector. An annular shoulder of the nozzle of the waterbox, which offers to these arms an inclined approach surface, locks in position the arms of the clip, the tightness between the tubular connector and a nozzle of the waterbox being ensured by a ring of an elastomer type material radially compressed between them. The nozzle of the waterbox is fitted with two axial and eccentric ribs which, separating the arms of the U-clip when the connector is subjected to rotation, facilitate the intentional unlocking of the assembly. A bushing on the waterbox cooperates with a pin on the connector to facilitate the longitudinal and radial guidance of the connector during assembly.

In such an embodiment, a clamping member distinct from the elements to be assembled is necessary, and this entails disadvantages and it is, accordingly, one aim of the present invention to overcome the drawback of such a device, while preserving its advantages, that is to say simple, of inexpensive construction, of easy application, and eliminating any risk of accidental disassembly, as well as the absence of a high effort both for assembly and for disassembly of the unit.

It is also an aim of the invention to provide a connecting device which, by simple visual inspection, enables to check that the locking condition is achieved.

The invention provides a connecting device, particularly for the assembly of a hose with a heat exchanger of an automotive vehicle, in which the hose is integral with a tubular component which can be connected to a socket of the waterbox of the heat exchanger by an easily dismantled elastic link consisting of a U-shaped clip the arms of which are housed in openings of the tubular component, the tightness between the latter and the socket of the waterbox being ensured by a ring of an elastomer type material, the arms of the U-shaped clip being designed to be housed in two transverse notches, mutually parallel and diametrically opposed, cut in the tubular wall of one of the two elements of the connecting device (namely said tubular component or said socket), the device being characterized in that:

it also comprises a mobile ring having on its periphery at least one tab elastically deformable in the radial direction, said ring being dimensioned to be able to be placed inside said one of the two elements which is provided with said transverse notches, in the transverse plane thereof and in such a way that its part that is not fitted with tab(s) masks the said notches and remains in this position in the absence of loading, the said tab(s) thus being compressed, and also in such a way that it is able to be pushed into this element beyond the notches under the effect of the thrust of the other element during assembly;

the element which is provided with said notches is also fitted with slits equal in number to that of the tabs of the ring, said slits being positioned in such a way that, in the assembly condition, said tabs being thus positioned opposite said slits they protrude therefrom and perform the function of a latch indicator; and in that the base of said U-shaped clip is integral with the element provided with said notches and slits, the U-shaped clip arms being spaced apart by said ring as long as the device is not assembled.

According to another feature of the device of the invention, the inner surface of said ring has a truncated part, the diameter of which decreases from the end of the ring designed to be placed near the free end of the element fitted with notches, and the other element has a peripheral annular part, the profile of which corresponds to that of the said truncated-cone part in such a manner that, when the two elements are pushed towards each other to be assembled, said peripheral annular part pushes said ring by bearing against its truncated-part.

According to another characteristic of the invention, the inner surface of the element fitted with said notches is shaped in such a way as to exhibit a gasket housing, said housing being advantageously formed by an inner shoulder and a ring added after the mounting of the gasket in said element.

Also, according to the invention, said ring is shaped in such a manner as to exhibit a conical inner end surface, the larger diameter of which is directed towards the free end of the element on which it is mounted, in order to offer a sloping guidance surface at the end of the other element.

According to a preferred embodiment of the invention, the free end of the other element comprises a first cylindrical part of outside diameter equal, within the necessary clearance, to the inside diameter of the part of the first element with which it is designed to cooperate to ensure tightness by compressing the gasket, and a second part of larger outside diameter, designed to push said ring and terminating at a distance from the end such that the free end of the socket abuts against the first element when the ring has been pushed as far as possible, in other words when its tab or tabs is (or are) in its (or their) expanded condition in the corresponding slit or slits.

According to an advantageous embodiment, said second part exhibits a conical outer surface widening towards the back, that is to say from the side opposite the free end of the socket, with the same conicity as the conical part of the ring.

According to yet another characteristic of the invention, the outer surface of the socket exhibits two shoulders defined by said second part and by a cylindrical part of larger outside diameter, respectively, making a support and retaining groove for the arms of the clip.

According to yet another characteristic of the invention, the ends of the arms of the U-shaped clip are fitted with means capable of facilitating the disassembly of the connecting device by decreasing the force necessary to separate the arms of the U-shaped clip, and said means advantageously consist of a curve elastic tab mounted between the free ends of the arms of the clip.

In a modification, said means consists of respective extensions of the U-shaped clip arms directed one towards the other, parallel to the base of the U and folded, after their intersection, in such a manner as to form two short arms parallel to the arms of the U, and which, when pinched together, cause the separation of the arms.

The invention shall be clearly understood by the following description, which refers to the attached drawing in which.

Figure 4:
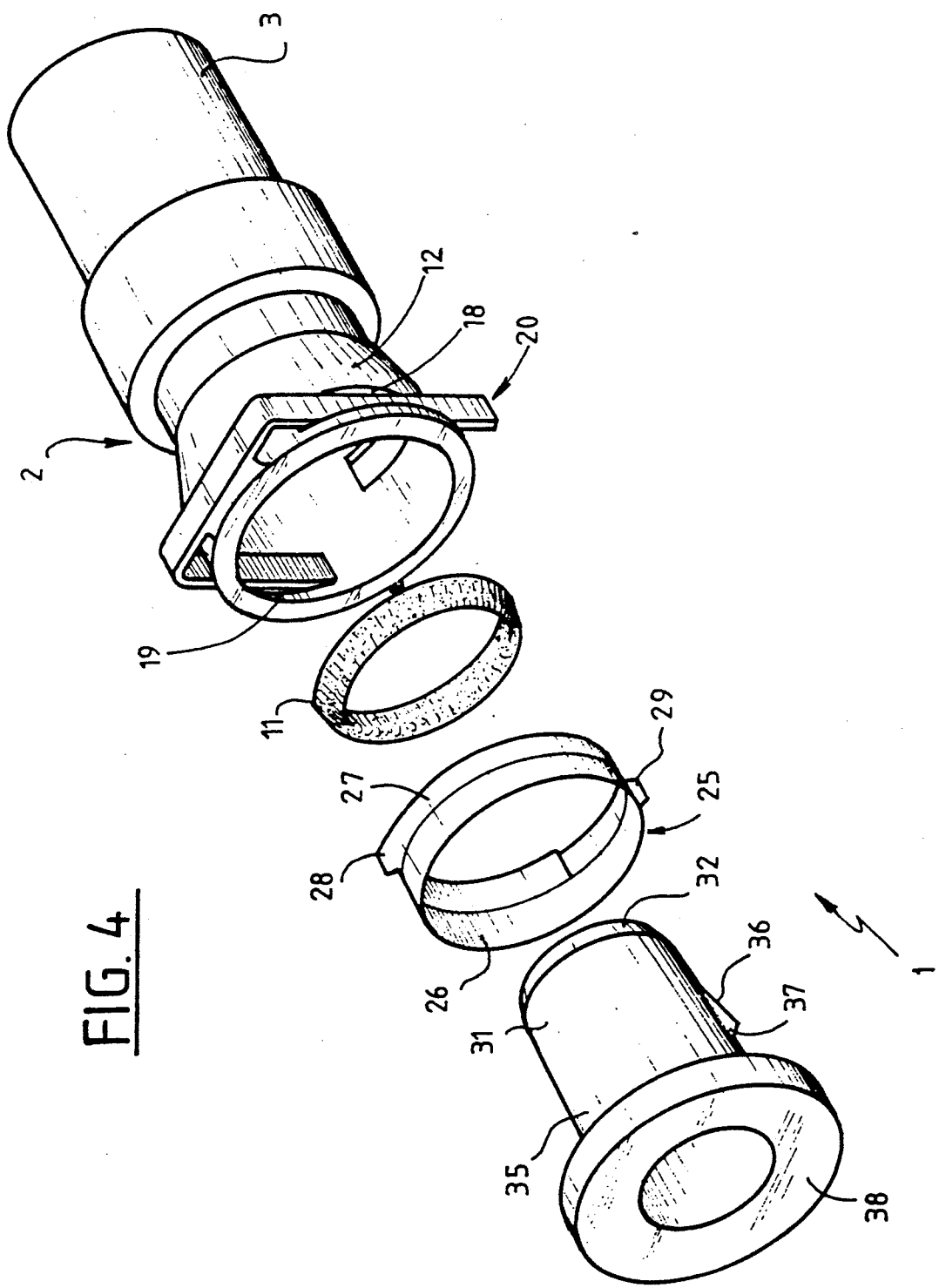
FIG. 4 is an exploded view of the different components of a device according to the invention.

The connecting device illustrated by way of example only in the figures is of the type of those described in French Patent Specification No 2 626 662, incorporated therein by reference, and in which a socket 1, projecting from the heat exchanger, not shown, is designed to be assembled with a tubular component 2 fixed to a flexible pipe or hose 3. The tubular component 2, advantageously made of molded plastic, has a sleeve 4 of axis A in which is housed a coaxial liner 5, also of molded plastic. The latter is shaped according to cylindrical parts 6, 7 and 8, of progressively increasing diameters, which thus provide a first shoulder 9 and a second shoulder 10 on which bears a seal 11 of the O-ring or lip-seal type, kept in position by a ring 13. The cylindrical part of tubular component 2, which is further apart from the flexible pipe or hose 3, terminates in a flared flange 12 in which are cut two relatively wide parallel transverse slits 15, 16, diametrically opposed, followed by a cylindrical part 17 of larger diameter, itself provided with two parallel transverse and diametrically opposed notches 18, 19 (shown in FIG. 4) and perpendicular to the slits 15, 16. The width of the notches is just sufficient to permit, during assembly, the passage of the arms of a U-shaped clip 20 of metal or sufficiently strong and elastic plastic material. In the cylindrical part 17 is mounted a ring 25, comprising a smooth conical part 26 and a cylindrical part 27 having two elastic tabs 28 and 29, the width of which matches that of the slits 15 and 16. When the ring 25 is inserted in the tubular component 2 before the latter is mounted on the heat exchanger, the compression of the elastic tabs 28 and 29 keeps it in position in part 17 of this component, as shown in FIG. 1.

The end of socket 1 of heat exchanger exhibits a first cylindrical part 31, the outside diameter of which matches that of the cylindrical part 7 of the tubular component 2, on the one hand, and which is slightly greater than that of the inside diameter of the seal 11, on the other hand. The free end 32 of the part 31 is also bevelled to facilitate the introduction of the socket into the tubular component and its sliding along gasket 11, the slope of the bevel being approximately equal to that of the conical inside end surface of the ring 13, which defines with the shoulder 10 the housing of said gasket, on the one hand, and ensures that the latter cannot be lost, on the other hand, after the connector is dismounted.

Figure 1:
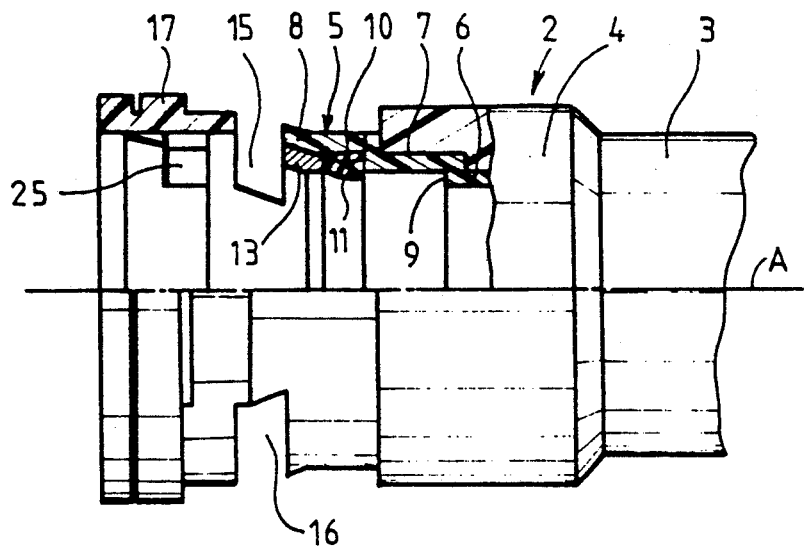
FIG. 1 is a side elevation with partially axial cross-sectional view of a tubular component of a device according to the invention before assembly.
Figure 2:
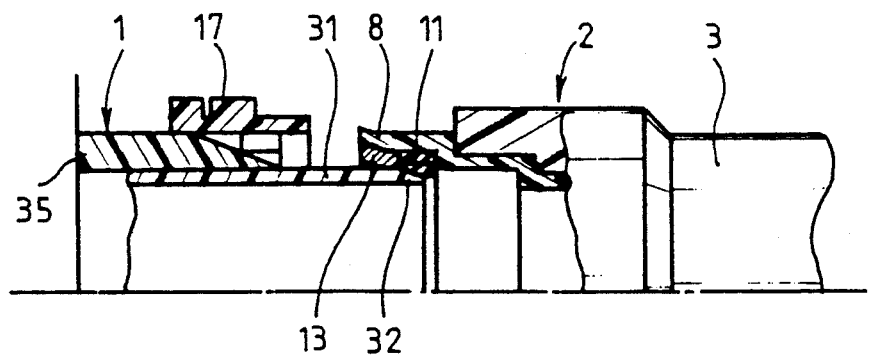
FIG. 2 is a partial axial cross-sectional view of the device during assembly, that is to say with the tubular component partly over the socket of the heat exchanger.
Figure 3:
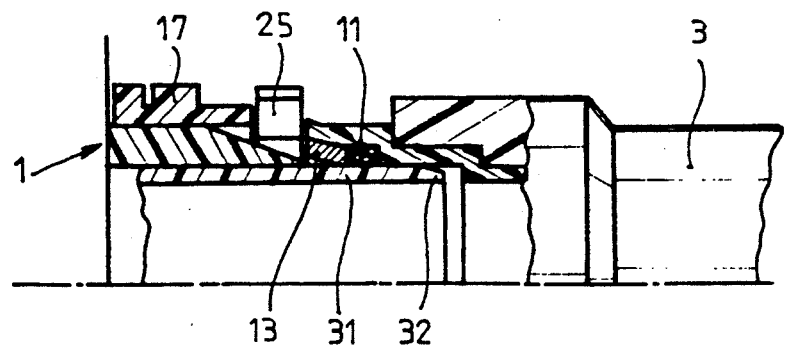
FIG. 3 is a partial axial cross-sectional view of the device after assembly.

As clearly shown in FIGS. 1 to 3, the cylindrical part 31 of socket 1 is, away from its bevelled end 32, terminated by a part 35 with a conical outer surface providing two ramps 36 slanted towards the back of the socket 1 and with the same slope as that of conical part 26 of ring 25, the rear face 37 of the ramps 36 limiting, with the transverse opposite face of a flange 38 of socket 1, a space for receiving the arms of the U-shaped clip, 20.

For the assembly of the connecting device, the tubular component 2 to which is fixed the hose 3 is brought towards the socket 1 of the heat exchanger. The arms of the U-shaped clip, -integral with component 2 by its base-, are separated from each other beyond their normal position by ring 21 housed in the part 17 of the tubular component. The latter can then cover, without important assembly effort, the socket 1 of the heat exchanger and, as the tubular component 2 approaches the flange 38, the ring 25 slides in part 17 until the ring 25 having escaped from the arms of clip 20, these arms penetrate into the space existing between the flange 38 and the rear face 37 of the ramps 36. The immobilization of the connecting device is then achieved, on the one hand, while the elastic tabs 28 and 29 of the ring 25 which are apparent in the notches 15 and 16 indicate that the connection has been achieved satisfactorily.

To dismantle the connecting device, it suffices to separate the arms of the U-shaped clip and to pull on the tubular component 2 and the hose associated with it away from socket 1.

In a modification, dismantling is performed by a relative rotation of the components of the connecting device if the latter is of the type described in French Patent Specification No 2 626 661 assigned to the same assignee as the instant application and which is enclosed therein by reference.

Figure 5:
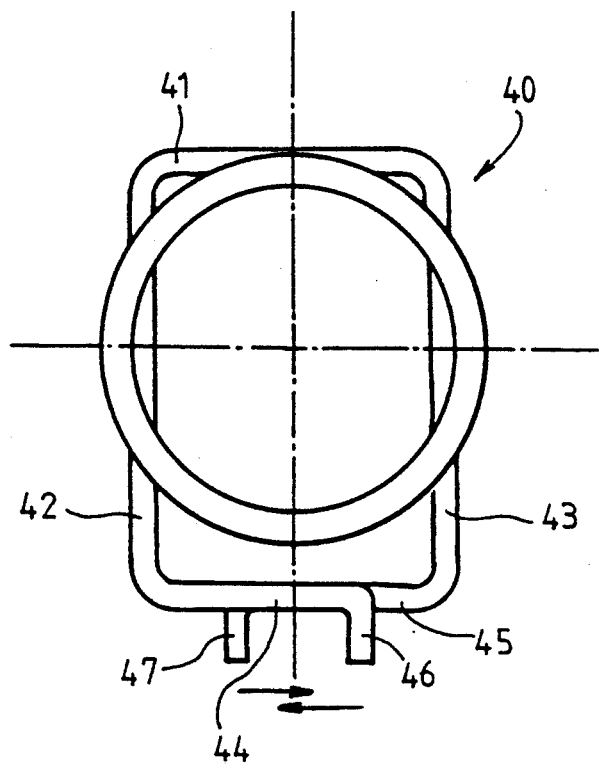
FIGS. 5 and 6 show modifications of one of the elements of the device.
Figure 6:
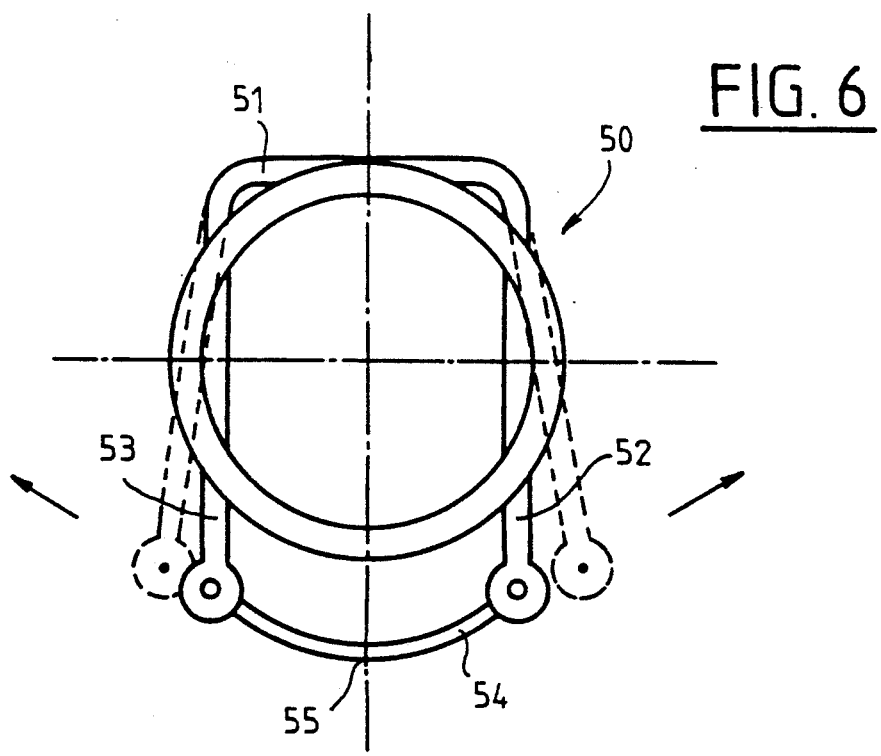

Reference is now made to FIGS. 5 and 6 which schematically show modifications of the embodiments of the clip of the device of the invention.

In the embodiment shown in FIG. 5, the clip 40 comprises a first U-shaped part identical to the clip of the previous embodiment with a core 41 for positioning and fixing it with respect to the tubular component 2 and two side arms 42 and 43, parallel or slightly convergent towards one another in the absence of external force exerted to separate them from each other, the said arms being extended by first portions 44 and 45, respectively, approximately parallel to the core 41, and themselves extended by short returns 46 and 47 directed approximately at right-angle to the portions 44 and 45. To actuate such a clip, the returns 46 and 47 are brought close to one another as shown by the double arrow in FIG. 5, with the result of separating the arms 42 and 43, making it possible to unlock the connector by separating the tubular component 2 from the socket 1 of the waterbox.

In the modification shown in FIG. 6, the clip 50 comprises a first U-shaped part identical to the clip of the embodiment shown in FIGS. 1 to 4, with a core 51 for fixing it to the tubular component 2 and two side arms 52 and 53 parallel or slightly convergent towards one another in the absence of external load exerted to separate them from each other, the ends of the U arms on the side opposite the core 51 of the clip being connected by a curved tab 54 exhibiting some elasticity so that, when the tab is mounted with its convexity turned towards the outside of the U, a simple pressure on or in the neighborhood of the tip 55 of the tab suffices to separate the arms of the clip.

I claim:

1. A connecting device for the assembly of a hose to a waterbox of a heat exchanger of an automotive vehicle, said connecting device comprising, in combination:

a first connector element in the form of a socket carried by the waterbox;

a second connector element in the form of a tubular component having a passage opening therethrough and being capable of being fit onto said socket;

a removable elastic link in the form of a U-shaped clip having arms which are adapted to be housed in the passage opening of said tubular component for holding said tubular component onto said socket;

a gasket positioned between said tubular component and said socket for sealing engagement therewith;

two transverse notches, mutually parallel and diametrically opposed, provided in the wall of one of said first or second connector elements for receiving the arms of the U-shaped clip when the connecting device is assembled; and abutment means on the other of said first or second connector elements for engagement with said arms for retaining said connector elements assembled;

a movable ring having on its periphery at least one tab which is elastically deformable in the radial direction, said ring being housed inside of said one connector element in the transverse plane of said notches and being so positioned that a portion thereof masks said notches, and so that said tab(s) are under compression against a surface of said one element to hold the movable ring in place; and slits, in a number equal to that of the tabs, provided on said one element, said slits being positioned in such a way that when the connecting device is assembled, said tabs are positioned opposite said slits and emerge from them to act as a latch indicator;

said movable ring serving to hold the arms of said U-shaped clip separated by engagement therewith when the connecting device is unassembled, but wherein upon assembling the connecting device, said ring is displaced in the tubular component as the socket is inserted into the tubular component, thereby allowing the arms of said U-shaped clip to move into an operating position engaging said abutment means for holding the connector elements in the assembled relationship.

2. A device according to claim 1, wherein the inner surface of said ring has a truncated-cone part the diameter of which decreases from the end of the ring designed to be placed near the free end of the element fitted with notches, and wherein the other element comprises a peripheral annular part the profile of which corresponds to that of said truncated part, in such a way that, when the two elements are brought close to one another to make the assembly, said peripheral annular part pushes said ring by bearing against the truncated-cone part of the ring.

3. A device according to claim 1, wherein the inner surface of the element provided with said notches is shaped in such a way as to exhibit a housing for said gasket, said housing having an inner shoulder and a ring axially spaced therefrom, said gasket positioned between said ring and shoulder, said ring being added after mounting of the gasket in said element.

4. A device according to claim 1, wherein said ring is shaped in such a manner as to exhibit an inner surface with a conical end the larger diameter of which is directed towards the free end of the element on which it is mounted, in order to offer a sloping guidance surface for the end of the other element.

5. A device according to claim 1, wherein the free end of the socket comprises a first cylindrical part of outside diameter equal, within the necessary clearance, to the inside diameter of the part of the tubular component with which it is designed to cooperate to ensure the tightness by compressing said gasket, and a second part of larger outside diameter, designed to push said ring and which exhibits a conical outer surface widening in the direction of the free end of the socket of the same conicity as that of the conical part of said ring.

6. A device according to claim 5, wherein said abutment means includes on the outer surface of the socket two ramps defining with a flange of the socket a support and retaining housing for the arms of the U-shaped clip.

7. A device according to claim 6, wherein the ends of the arms of the clip are fitted with means capable of facilitating the dismantling of the assembly by decreasing the force necessary to spread apart the arms of said clip.

8. A device according to claim 7, wherein said means consists of a curved elastic tab mounted between the free ends of the arms of the U-shaped clip.

9. A device according to claim 7, wherein said means consists of extensions of the arms of the U-shaped clip, which, when pushed towards each other by pinching, causes the separation of said arms of the U-shaped clip.

* * * * *